(12) United States Patent
Isci et al.

(10) Patent No.: US 11,075,983 B2
(45) Date of Patent: Jul. 27, 2021

(54) COMPLIANCE AWARE SERVICE REGISTRY AND LOAD BALANCING

(71) Applicant: International Business Machines Corporation, Armonk, NY (US)

(72) Inventors: Canturk Isci, Ridgewood, NJ (US); Shripad Nadgowda, Pratap Nagar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/689,322

(22) Filed: Nov. 20, 2019

(65) Prior Publication Data
US 2020/0092358 A1      Mar. 19, 2020

Related U.S. Application Data

(62) Division of application No. 15/789,649, filed on Oct. 20, 2017, now Pat. No. 10,530,849.

(51) Int. Cl.
| | |
|---|---|
| *G06F 15/173* | (2006.01) |
| *H04L 29/08* | (2006.01) |
| *H04L 29/06* | (2006.01) |
| *G06F 9/30* | (2018.01) |
| *H04L 12/803* | (2013.01) |

(52) U.S. Cl.
CPC ...... *H04L 67/1012* (2013.01); *G06F 9/30127* (2013.01); *H04L 47/125* (2013.01); *H04L 63/108* (2013.01)

(58) Field of Classification Search
CPC . H04L 67/1012; H04L 47/125; H04L 63/108; G06F 9/30127
See application file for complete search history.

(56) References Cited

U.S. PATENT DOCUMENTS

| | | |
|---|---|---|
| 8,234,640 B1 | 7/2012 | Fitzgerald et al. |
| 8,539,061 B2 | 9/2013 | Shi |
| 8,572,691 B2 | 10/2013 | Readshaw |
| 9,438,680 B1 | 9/2016 | Bingham, Jr. et al. |

(Continued)

OTHER PUBLICATIONS

Notice of Allowance received for U.S. Appl. No. 15/789,649 dated Aug. 28, 2019, 25 pages.

(Continued)

*Primary Examiner* — Wing F Chan
*Assistant Examiner* — Joseph R Maniwang
(74) *Attorney, Agent, or Firm* — Amin, Turocy & Watson, LLP

(57) ABSTRACT

Techniques facilitating compliance aware service registry and load balancing are provided. A system can comprise a memory that stores computer executable components and a processor that executes computer executable components stored in the memory. The computer executable components can comprise an extraction component that removes a service from a load balancer ring based on a first determination by a verification component that a compliance state of the service is a non-compliant state. Further, the computer executable components can comprise an insertion component that adds the service to the load balancer ring based on a second determination by the verification component that, after a defined amount of time, the compliance state of the service is a compliant state.

14 Claims, 13 Drawing Sheets

(56) References Cited

U.S. PATENT DOCUMENTS

| | | | | |
|---|---|---|---|---|
| 2003/0188039 A1* | 10/2003 | Liu | ................. | G06F 16/958 |
| | | | | 719/315 |
| 2006/0156008 A1 | 7/2006 | Frank | | |
| 2008/0065466 A1* | 3/2008 | Liu | ................. | G06Q 10/067 |
| | | | | 705/348 |
| 2011/0179007 A1* | 7/2011 | Shi | ................. | G06F 16/958 |
| | | | | 707/706 |
| 2012/0066487 A1 | 3/2012 | Brown et al. | | |
| 2013/0198319 A1 | 8/2013 | Shen et al. | | |

OTHER PUBLICATIONS

"PCI Compliance Considerations and Barracuda Load Balancer Deployment", URL: https://campus.barracuda.com/product/loadbalancer/article/display/BLBv42/PCI+Compliance+Considerations+and+Barracuda+Load+Balancer+Deployment/, Aug. 19, 2015, 10 pages.

Mell et al., "The NIST Definition of Cloud Computing", National Institute of Standards and Technology, Special Publication 800-145, U.S Department of Commerce, Sep. 2011, 7 pages.

\* cited by examiner

COMPLIANCE AWARE SERVICE REGISTRY AND LOAD BALANCING

BACKGROUND

The subject disclosure relates to cloud computing platforms and services, and more specifically to compliance aware service registry and load balancing.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses, and/or computer program products that facilitate compliance aware service registry and load balancing are described.

According to an embodiment, a system can comprise a memory that stores computer executable components and a processor that executes the computer executable components stored in the memory. The computer executable components can comprise an extraction component that can remove a service from a load balancer ring based on a first determination by a verification component that a compliance state of the service is a non-compliant state. Further, the computer executable components can comprise an insertion component that can add the service to the load balancer ring based on a second determination by the verification component that, after a defined amount of time, the compliance state of the service is a compliant state.

According to another embodiment, a computer-implemented method can comprise registering, by a system operatively coupled to a processor, a service determined to be a compliant service in a compliance-aware service registry. The computer-implemented method can also comprise evaluating, by the system, the compliant service in the compliance-aware service registry for runtime compliance. Further, the method can comprise deregistering, by the system, the compliant service from the compliance-aware service registry based on a determination that the compliant service no longer satisfies a defined compliant policy rule during the runtime compliance.

According to a further embodiment, a computer program product that facilitates compliance aware service registry and load balancing is provided. The computer program product can comprise a computer readable storage medium having program instructions embodied therewith, the program instructions executable by a processing component to cause the processing component to determine a compliance state of a service at runtime, wherein the compliance state is evaluated with respect to a policy associated with a device requesting use of the service. The program instructions can also cause the processing component to deactivate an active status of the service based on a determination that the service is non-compliant for the policy. Further, the program instructions can cause the processing component to evaluate, after a defined interval, the compliance state of the service with respect to the policy and reapply the active status of the service based on the compliance state of the service being compliant for the policy after the defined interval.

DETAILED DESCRIPTION

Figure 1:
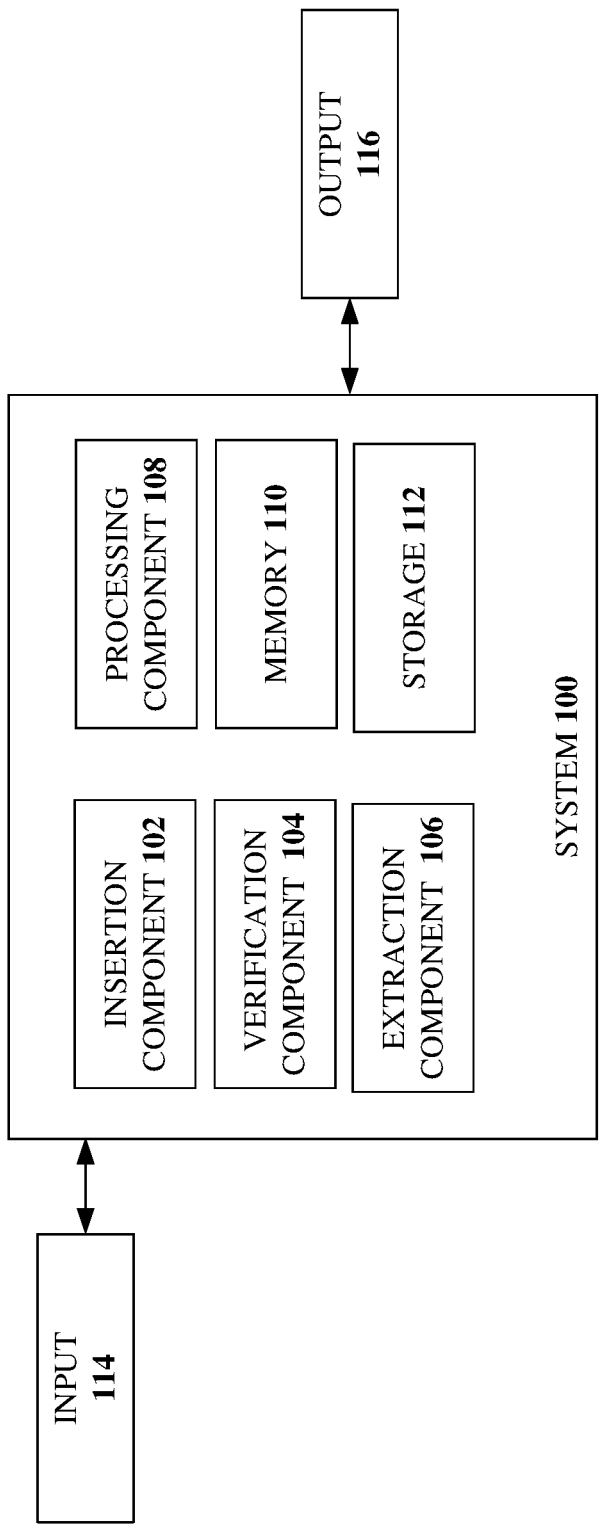
FIG. 1 illustrates a block diagram of an example, non-limiting, system that facilitates service level compliance at runtime in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The various aspects discussed herein relate to compliance aware service registry and load balancing. Specifically, one or more of the various aspects can enable service level compliance at runtime. Further, one or more of the various aspects can complement runtime compliance checking with microservice discovery and compliance-aware load balancing.

For example, for platforms and foundation services in a cloud computing environment, service providers can expose their platforms in order for customers to deploy their applications (e.g., their containers). Accordingly, the applications should be in compliance so that the customers can be serviced with compliant services. This can also be beneficial for the service providers (e.g., cloud providers) so that the cloud providers do not expose their platform to malicious or non-compliant activities. Accordingly, the various aspects can ensure that applications that run on the cloud are compliant with defined standards.

The following is an example of a non-compliant application that is inadvertently allowed to run in the cloud. A service provider has its sequel image build in, and installed within, the cloud computing environment. Various users can be allowed to remotely connect to the service. However, the service provider has a simple password that can be easily hacked and, thus, various vulnerabilities can be exposed. Without strengthening the password, the service provider puts its services in the cloud, and the services become available. Thereafter, a malicious entity compromises the password, accesses the container, and modifies configurations or performs other malicious activity inside the container. In addition, group services installed on the container, which can be hidden, can manifest themselves in certain cases. For example, a user executes a command for an output of recommended processes. Since, in this example, the service has been compromised, instead of providing an accurate list of safe processes, the user is provided a list of unsafe processes, which can compromise the user's computer.

As it relates to compliance aware service registry and discovery, in a distributed system and microservice architecture, service discovery can be a function that can help identify endpoints for services. In accordance with one or more aspects, a compliance-aware service registry is provided, where only compliant services (e.g., services that conform to user compliance policy rules) can be registered and discovered by other services. Non-compliant services are not registered with the service registry and are not included in a load balancer ring. Further, according to the various aspects, the registered services can be continuously or continually evaluated for runtime compliance and can be deregistered, or become undiscoverable by other services, upon or after the non-compliance state of the service is determined.

Load balancing can be another distributed system architecture that can distribute workload across multiple computing resources. In accordance with one or more aspects, a compliance aware load balancer is provided where a compliance state of services can be used in conjunction with various balancing algorithms (e.g., a round-robin or other type of balancing algorithm). According to one or more aspects provided herein, user requests can be forwarded to the compliant services, while non-compliant services can be bypassed or not forwarded user requests.

FIG. 1 illustrates a block diagram of an example, non-limiting, system 100 that facilitates service level compliance at runtime in accordance with one or more embodiments described herein. Aspects of systems (e.g., the system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The various systems and/or components of the systems can be employed to solve new problems that arise through advancements in technology, computer networks, the Internet, and the like. As an example, a new problem that can arise can include an instance of a service being compliant when the service is registered in a service registry, however, when the service is attempted to be utilized, the service is not compliant for a policy associated with the use of the service. Another new problem that can arise is a non-compliant instance of a service being included in a load balancer ring and request traffic is forwarded to the non-compliant instance of the service. Thus, the various systems and/or components of the systems can determine a compliance status of the instances of the services at runtime, which can be on a per policy basis. If a service is not compliant, that service can be removed from a load balancer ring, which can increase a compliance capability and routing efficiency of the load balancer ring.

As illustrated, the system 100 can comprise an insertion component 102, a verification component 104, an extraction component 106, a processing component 108, a memory 110, and/or a storage 112. In some embodiments, one or more of the insertion component 102, the verification component 104, the extraction component 106, the processing component 108, the memory 110, and/or the storage 112 can be communicatively and/or operatively coupled to one another to perform one or more functions of the system 100.

Cloud application services, or Software as a Service (SaaS), use the web to deliver applications that can be managed by a third-party vendor, and which can be accessed on the client side. The web delivery nature of cloud application services allows the client to run applications on individual computers without installing the applications on the computers. Some examples of cloud application services include, but are not limited to, email applications, word processing applications, healthcare related applications, financial or invoicing applications, and so on.

Cloud platform services, also referred to as Platform as a Service (PaaS) can be utilized by clients to simplify the development, testing, and deployment of applications without the complexity of building and maintaining the infrastructure. Further, cloud infrastructure services, also referred to as Infrastructure as a Service (IaaS) can be self-service modules for accessing, monitoring, and/or managing remote data center services (e.g., storage, networking, firewalls, and so on).

Ensuring compliance of applications hosted on public cloud computing platforms (e.g., PaaS, IaaS) can be utilized to help cloud providers secure their platform from malicious users. Further, compliance of applications helps the clients running on the cloud to meet their compliance requirements while sharing the burden/responsibility with the provider. The process of compliance validation can be subjective and can differ between clients. Thus, in multi-tenant offerings, compliance can be policy-driven, where clients can specify the compliance rules that apply to their requirements.

There can be various stages in the lifecycle of an application, where compliance rules can be checked and enforced. For example, in some systems, vulnerabilities can be detected and compliance rules can be enforced during multiple stages of a development and/or operations (DevOps) cycle, such as when an application image is built and pushed to the cloud and before the application can be instantiated. However, compliance stature of an application can vary as the state of an application changes during its lifetime and/or as the application dynamically evolves.

The various aspects discussed herein can continually (or continuously) monitor various services offered in a cloud computing environment. Service providers that host their application on the cloud could over-provision their applications to assist with high-availability and load-balancing (e.g., replicas). Since the dynamic behavior, input requests, and potential malicious activity for the one or more instances of a service can be neither identical nor synchronous, the services that originate from a single compliant image could evolve differently, and their compliance posture can diverge over time. This can result in a service being partially compliant/non-compliant, in a similar vain as partial availability. For example, consider a customer that is hosting six instances of a database, cache, and message broker service, with a load balancer in front of these service instances. Over time two (or any number) of the services can become non-compliant due to a bug, an ill-formed input, malicious activity, and/or an exposed vulnerability. Even though compliance was built into the development/operations (DevOps) cycle, the entire application can be rendered non-compliant, due to this partial runtime divergence. Compliance, however, can still be enforced, by intelligently load balancing, not for just availability and performance, but for continuous (or continual) compliance of the current service, routing user requests to compliant instances, and replicating new instances in accordance with the one or more aspects discussed herein.

The insertion component 102 can register a service determined to be a compliant service in a compliance-aware service registry. The service can be selected from a group consisting of a container, a virtual machine, and a physical host. To determine whether the service is a compliant service, the verification component 104 can determine the compliance state of the service. For example, the determination by the verification component 104 can be performed upon or after the service is requested to be registered.

During runtime, the verification component 104 can evaluate the compliant service in the compliance-aware service registry for runtime compliance. Determining the compliance of the service at runtime can increase a routing efficiency of the load balancer ring. In various embodiments, the verification component 104 can receive, as input 114, information related to one or more policies. For example, a first policy can be associated with a first entity, a second policy can be associated with a second entity, a third policy can be associated with a third entity, and so on. As utilized herein an entity can be one or more computers, the Internet, one or more systems, one or more commercial enterprises, one or more computers, one or more computer programs, one or more machines, machinery, one or more actors, one or more users, one or ore more customers, one or more clients, one or more humans, and so forth, hereinafter referred to as an entity or entities depending on the context.

According to an implementation, the verification component 104 can evaluate the service for runtime compliance by determining whether the service conforms to a policy. The policy can be selected from a group consisting of a security policy, a vulnerability policy, and a customized policy. In an example, the verification component 104 can evaluate the compliant service on a per policy basis. Therefore, during runtime, the service can be compliant for a first use of the service (e.g., based on a first policy associated with a first entity), and non-compliant for a second use of the service (e.g., based on a second policy associated with a second entity).

In a simplified example, a service can relate to registration of passwords. A first policy associated with a first entity can be that the password is to comprise at least eight characters. Therefore, any password that is seven characters or less does not comply with the policy and would be determined by the verification component 104 to be non-compliant. However, passwords with eight or more characters can be determined by the verification component 104 to be compliant during runtime. Further to this example, a second policy associated with a second entity can be that the password is to comprise at least six characters. Therefore, although a password that has six or seven characters is non-compliant for the first policy, the password can be compliant for the second policy. Thus, the determination can be on a per-policy basis.

If it is determined by the verification component 104 that the service is compliant during runtime, use of the service is allowed. However, if the verification component 104 determines the service is non-compliant, the extraction component 106 can deregister the (previously) compliant service from the compliance-aware service registry. The information related to the deregistering of the service can be provided as output 116. The deregistration of the service can be automatically performed by the extraction component 106. Thus, if the (previously) compliant service no longer satisfies a defined compliant policy rule during the runtime compliance, that service is no longer available for use, even though a previous determination indicated that the service was compliant.

The systems and/or the components of the systems discussed herein can be employed to use hardware and/or software to solve problems that are highly technical in nature (e.g., determine a compliance state of a service at runtime, determine load balancing across the compliant services), that are not abstract and that cannot be performed as a set of mental acts by a human. The service registry, compliance status, and load balancing as a function of disparate policies across multiple entities cannot be determined as a set of mental acts. For example, one or more of the services can be compliant for a first defined policy but not compliant for a second defined policy. Therefore, a first entity associated with the first policy can use the compliant service, while a second entity associated with the second policy cannot use that instance of the service since it is non-compliant for the second policy. Further, load balancing across multiple containers and instances of service can be automatically performed based on the compliant or non-compliant status of the respective services.

Further, some of the processes performed can be performed by specialized computers for carrying out defined tasks related to compliance aware service registry and load balancing. For example, a human, or even thousands of humans, cannot efficiently, accurately, and effectively manually evaluate policies against multiple instances of services or containers while balancing the request traffic across the compliant services to accommodate the multiple electronic requests for the services. The various systems and/or components of the systems can be employed to solve new problems that arise through advancements in technology, computer networks, the Internet, and the like. The various systems can provide technical improvements to service registry and load balancing by improving processing efficiency among processing components in a runtime compliance and service fulfillment system by automatically removing non-compliant services and adding (or re-adding) compliant services dynamically, after a defined interval of time, and to automatically reconfigure load balancing across the compliant services. In addition, the various aspects cannot be performed by a human (e.g., using approaches that are greater than the capability of a single human mind). For example, the amount of data processed (e.g., comparing policies to services, balancing of request traffic load among the compliant services), the speed of processing of the data, and/or the electronic data types processed by the various aspects over a certain period of time can be respectively greater, faster, and different than the amount, speed and data type that can be processed by a single human mind over the same period of time.

Figure 2:
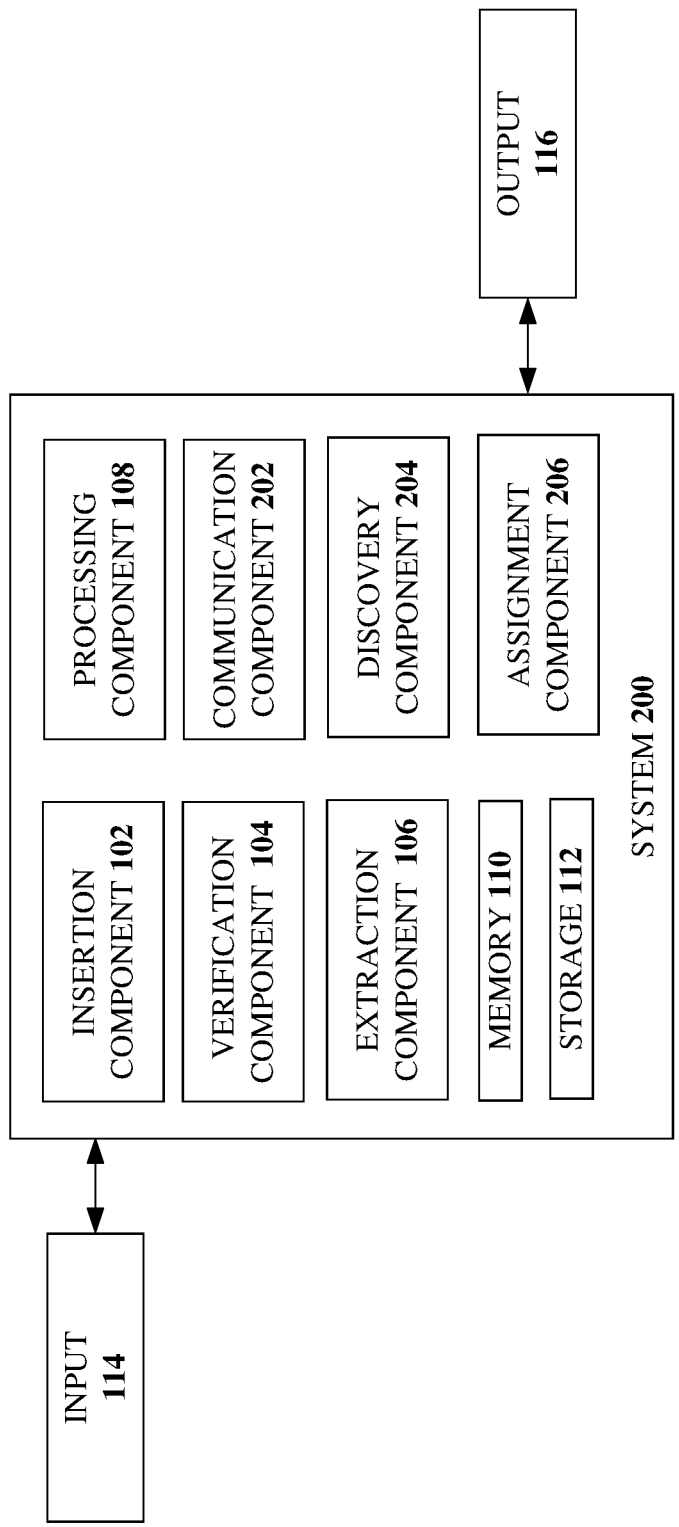
FIG. 2 illustrates a block diagram of an example, non-limiting, system that facilitates registering a service based on a challenge-response model in accordance with one or more embodiments described herein.

FIG. 2 illustrates a block diagram of an example, non-limiting, system 200 that facilitates registering a service based on a challenge-response model in accordance with one or more embodiments described herein. Repetitive description of like elements employed in other embodiments described herein is omitted for sake of brevity.

The system 200 can comprise one or more of the components and/or functionality of the system 100, and vice versa. In various implementations, the verification component 104 can determine the compliance state of the service upon or after a request to register the service is received (e.g., as input 114). The verification component 104 can perform a first determination whether the service is in a compliance state or is in a non-compliance state. For example, the verification component 104 can compare the policy associated with the request traffic to an associated policy to determine the runtime compliance status.

If the service is in a compliance state, the service can be available for use. The use of the service can be determined based on a balancing algorithm. For example, the balancing algorithm can be a round-robin balancing algorithm or another balancing algorithm. Alternatively, if the first determination is that the service is in a non-compliance state, the extraction component 106 can remove the service from a load balancer ring. Thus, request traffic for the service is not routed to the service that is determined to be in the non-compliance state.

After a defined period of time, the verification component 104 can perform a second determination to determine the compliance status of the service. As an example, the defined period of time can be expressed as minutes (e.g., 5 minutes, 10 minutes, 20 minutes), as hours (e.g., one hour, three hours, six hours), or another interval determined to be sufficient for an instance of a service, or a container, to be repaired and/or its status changed to be in compliance with one or more policies. If the service returns to a compliance state, the insertion component 102 can add the service to the load balance ring. For example, the verification component 104 can perform the first determination and the second determination based on a first policy for a first device that requests use of the service. According to an implementation, the first policy can comprise a quality of service parameter defined for the first device.

According to some implementations, the verification component 104 can perform a third determination based on a second policy defined for a second device that requests the use of the service. If the service is determined to be non-compliant based on the third determination, the service can be removed from the load balancer ring by the extraction component 106. After a defined amount of time, the verification component 104 can perform a fourth determination on the service to evaluate the compliant state of the service. If the service is compliant based on the fourth determination, the service can be re-added to the load balance ring by the insertion component 102. The first determination and the second determination can be independent of the third determination and the fourth determination.

To register the service, a communication component 202 can send a register request for the service to a centralized registry service. Based on the request, the verification component 104 can determine that a compliance report received from the centralized registry service is a fair report (e.g., an objective report). The credentials of the service can be stored in a centralized registry service or in the memory 110, for example.

According to some implementations, the system 200 can comprise a discovery component 204 that can enable the compliant service, registered in the compliance-aware service registry, to be discoverable by other services. As one or more requests are received for access to the service, an assignment component 206 can operate as a load balancer and can forward request traffic for the service to a compliant service. Therefore, the request traffic can bypass a non-compliant service and can increase a routing efficiency of the load balancer ring. According to some implementations, the assignment component 206 can receive as input 114 an indication of respective compliance states of one or more services. For example, the respective compliance states can indicate whether a service of the one or more services is a compliant service or is a non-compliant service. Further, in some implementations, the assignment component 206 can receive as input a request for at least a first service of the one or more services. The request can be received from the one or more entities that provided the policies, or from one or more entities that are authorized to access at least the first service of the one or more services.

In an example, the assignment component 206 can be a compliance aware load balancer. Thus, a compliance policy can be enforced in the system 200. Further, the system 200 can support various load balancing algorithms including round-robin, URI affinity, least connection, source, shortest-path, Asymmetric load, priority queuing, and so on. The disclosed aspects can be utilized to consider the policy driven compliance state of the end-points as discussed herein.

For example, a load balance can be initially configured with six service endpoints for a database, cache, and message broker service. The load balance can be a round-robin load balance and the six services can be validated and determined to be compliant. Therefore, requests can be forwarded to the six compliant services. This can be similar to implementing "heartbeats" to periodically check the liveliness of the endpoints. In accordance with the various aspects discussed herein, "compliance-beats" can be implemented to periodically check the compliance state of the services. Based on issuance of a non-compliance report, the services determined to be non-compliant can be removed from the load balancer ring. Upon or after the service is corrected and returned to a compliant status, the service can be again added to the balancer ring to serve user requests. Further details related to compliance aware service registry and load balance are provided with respect to FIGS. 3-5.

Figure 3:
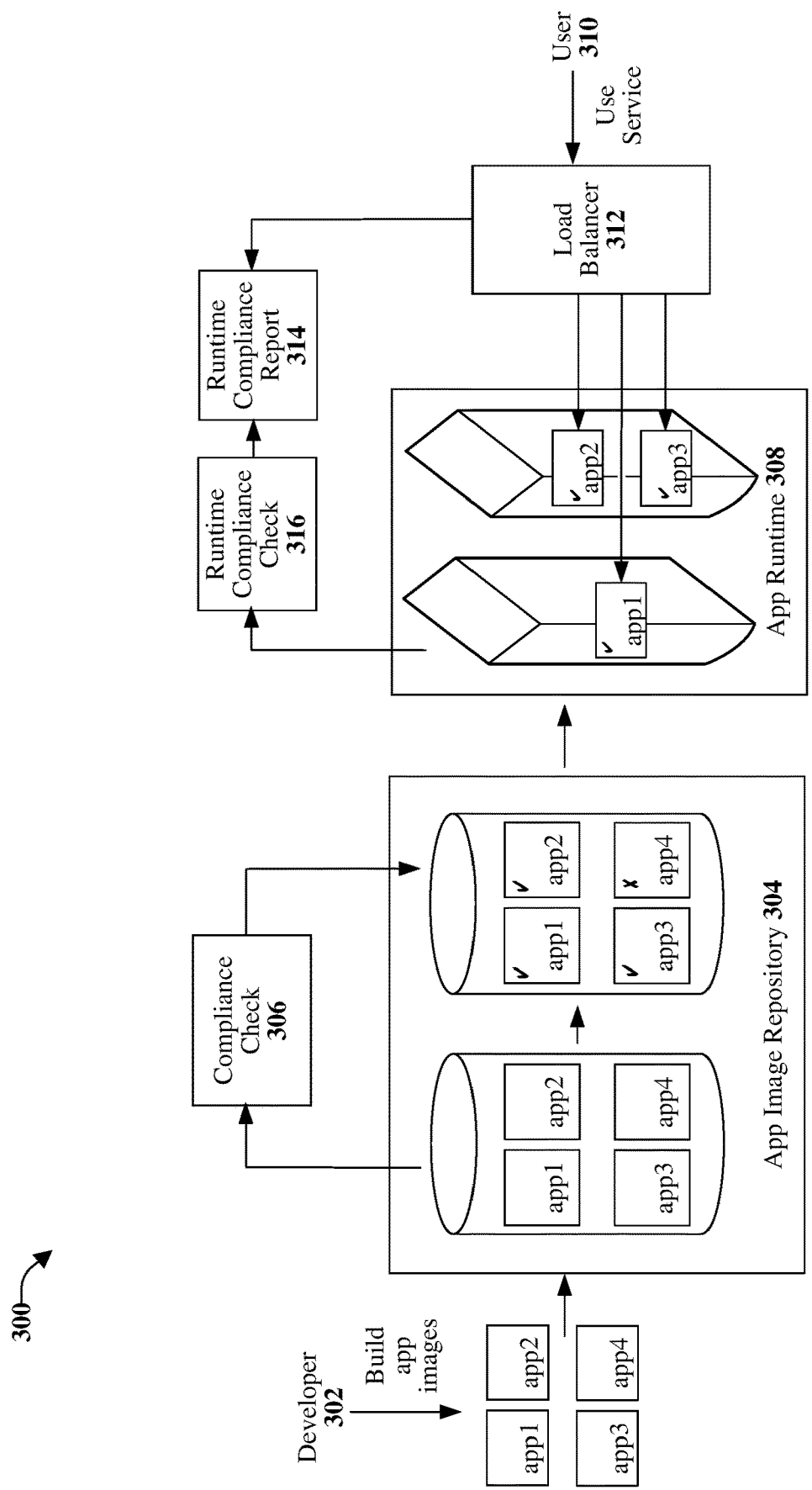
FIG. 3 illustrates an example, non-limiting, system for compliance load balancing in accordance with one or more embodiments described herein.

FIG. 3 illustrates an example, non-limiting, system 300 for compliance load balancing in accordance with one or more embodiments described herein. Repetitive description of like elements employed in other embodiments described herein is omitted for sake of brevity.

The system 300 can comprise one or more of the components and/or functionality of the system 100, the system 200, and vice versa. As illustrated an entity 302, such as a developer entity, can build application images, such as a first application (app1), a second application (app2), a third application (app3), and a fourth application (app4). The applications can be registered in an application image repository 304 (e.g., via the insertion component 102).

Upon or after the applications are registered, a compliance check 306 can be performed. In the illustrated example, app1, app2, and app3 are in compliance (as indicated by the check marks), however, app4 is not in compliance (as indicated by the "x"). Therefore, app1, app2, and app3 can be available for use at application runtime 308.

When an entity 310 requests use of a service, a load balancer 312 (e.g., the assignment component 206) can perform, or can request, a runtime compliance report 314. Therefore, a compliance check 316 can be performed. In this example, all three applications (e.g., app1, app2, and app3) are in compliance at runtime. Therefore, the load balancer 312 selectively routes the traffic to the three applications (as indicated by the arrow lines).

Figure 4:
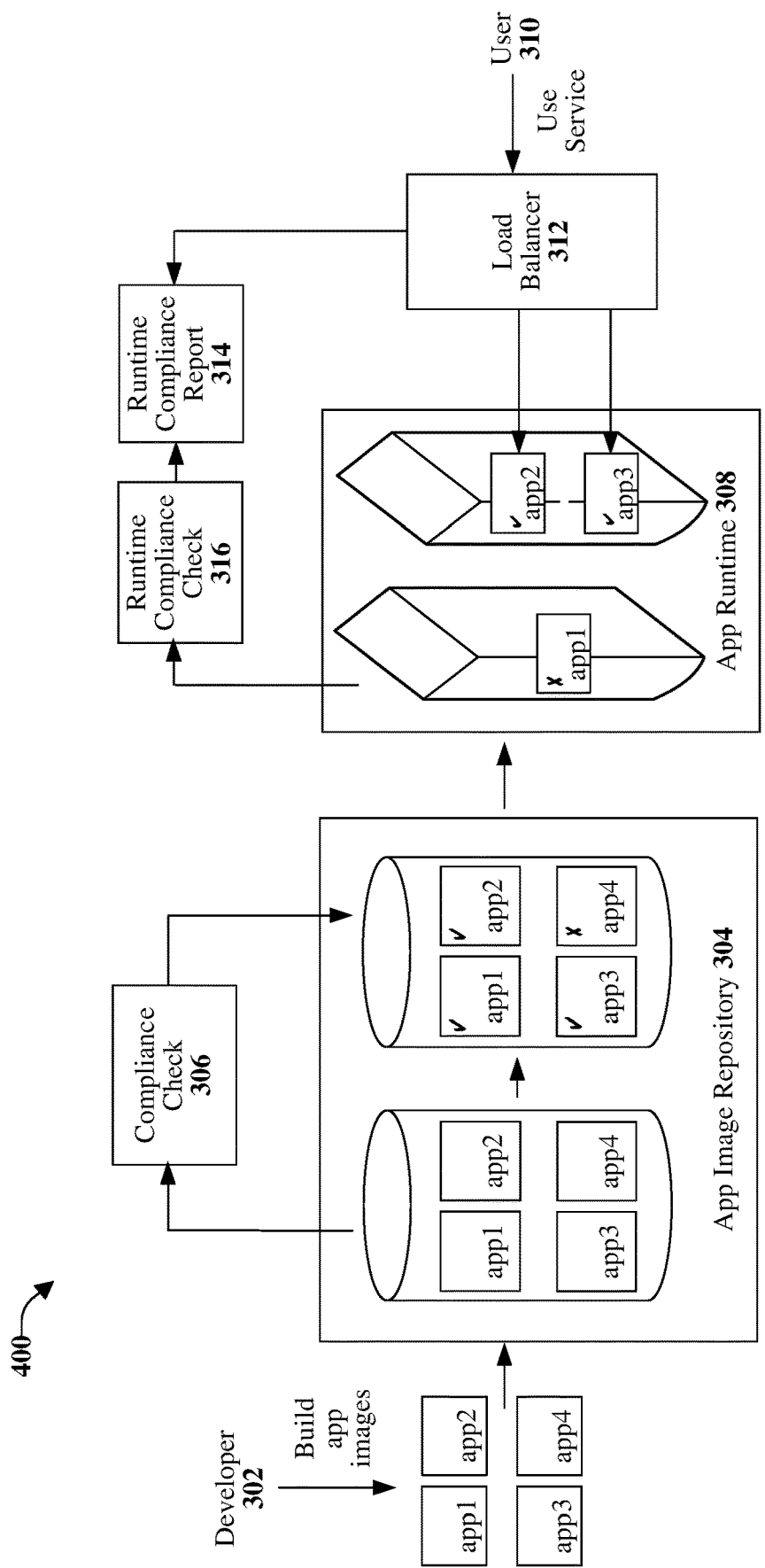
FIG. 4 illustrates an example, non-limiting, system for compliance load balancing when one or more services are non-compliant services in accordance with one or more embodiments described herein.

FIG. 4 illustrates an example, non-limiting, system 400 for compliance load balancing when one or more services are non-compliant services in accordance with one or more embodiments described herein. Repetitive description of like elements employed in other embodiments described herein is omitted for sake of brevity.

The system 400 can comprise one or more of the components and/or functionality of the system 100, the system 200, the system 300, and vice versa. As illustrated during the application runtime 308, the compliance check 316 can determine whether a service is in compliance or is no longer in compliance. In this example, app1 is determined to be non-compliant during runtime (as indicated by the "x"). However, both app2 and app3 are determined to be compliant (as indicated by the check marks). Therefore, based on the entity 310 request, the load balancer 312 can route the request traffic to the compliant services, namely, app2 and app3 in this example. Thus, traffic is not routed to the non-compliant service (app1) in accordance with the various aspects discussed herein.

In an example of load balancing as discussed herein, a request (e.g., from the entity 310) can be received and the load balancer 312 can be aware of the compliant or non-compliant state of the end point (e.g., the containers). By way of example, there can be ten containers running, and the load balancer 312 knows that eight of the ten containers are compliant due to a defined policy associated with the entity 310 (e.g., as indicated in the runtime compliance report 314). Accordingly, the load balancer 312 does not direct traffic to the two containers that are determined to be non-compliant. If one or more of the non-compliant containers becomes available in a compliant state, the load balancer 312 can begin to also route traffic to that containers as part of a load balancer ring.

Figure 5:
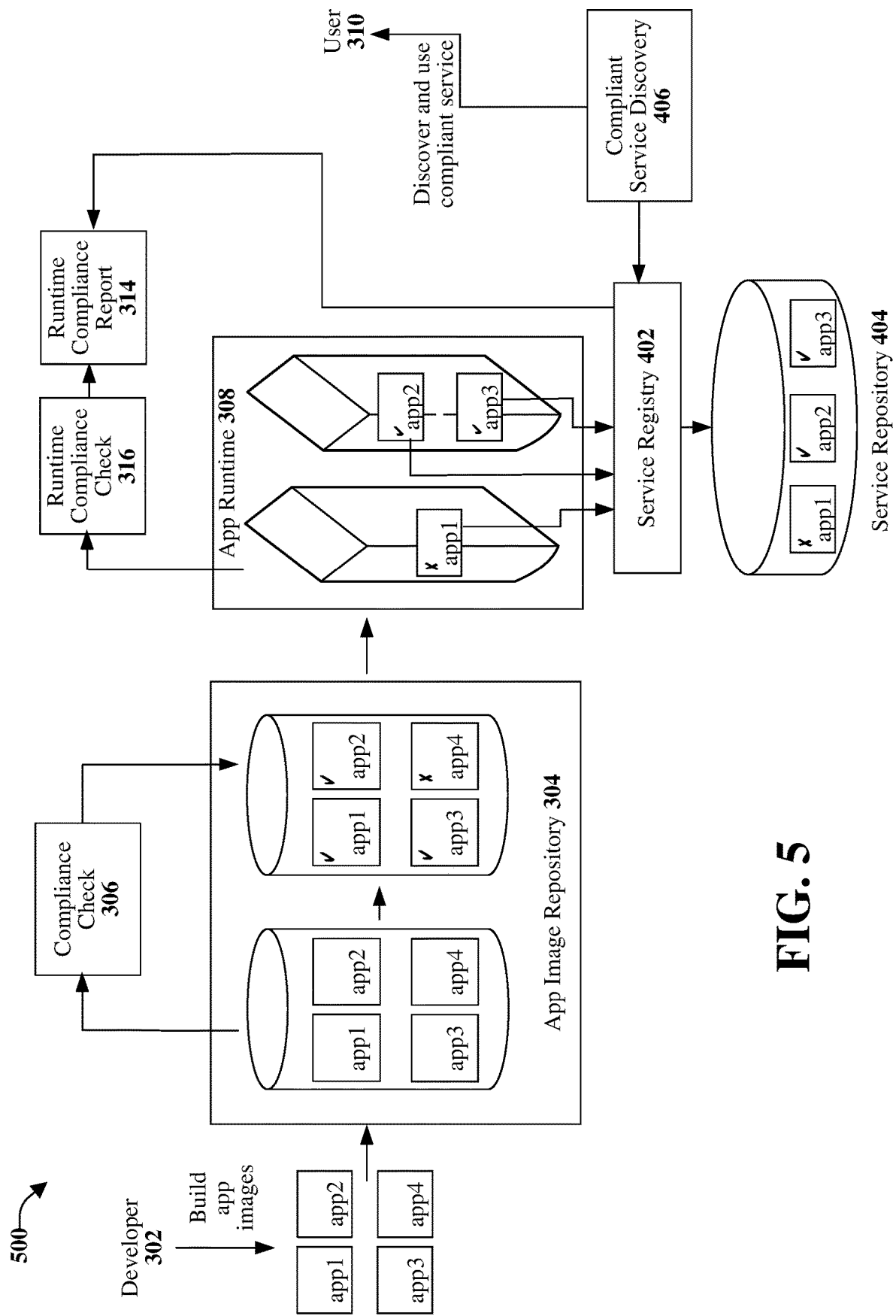
FIG. 5 illustrates an example, non-limiting, system for compliance service discovery in accordance with one or more embodiments described herein.

FIG. 5 illustrates an example, non-limiting, system 500 for compliance service discovery in accordance with one or more embodiments described herein. Repetitive description of like elements employed in other embodiments described herein is omitted for sake of brevity.

The system 500 can comprise one or more of the components and/or functionality of the system 100, the system 200, the system 300, the system 400, and vice versa. As illustrated, during the application runtime 308, one or more applications can be registered with a compliance aware service registry 402. For example, if an application requested to be registered is determined to be compliant with a policy, that application can be registered in the compliance aware service registry 402. Further, the applications, or information related to the applications, can be retained in a service repository 404. During operations, a compliant service discovery 406 can be performed in order for the entity 310 to discover and use a compliant service, which can be provided as output 116.

For example, the compliance aware service registry 402 can be a highly available key-value store where every new service registers. The registrations can be a single Representational State Transfer (REST) request to a Key Value (KV) store, and in some cases, certificates can be exchanged as a part of registry, to be used for future communications. According to the aspects discussed herein, a challenge-response model for service registration can be built.

In an example, the process of service registration can include the service sending a "register" request to a centralized registry service. The registry service can challenge and can request a compliance report from a trusted entity. Upon or after receipt of a fair or objective compliance report, the registry service can register the service and store its credentials (if exchanges with any certificates can be performed).

Figure 6:
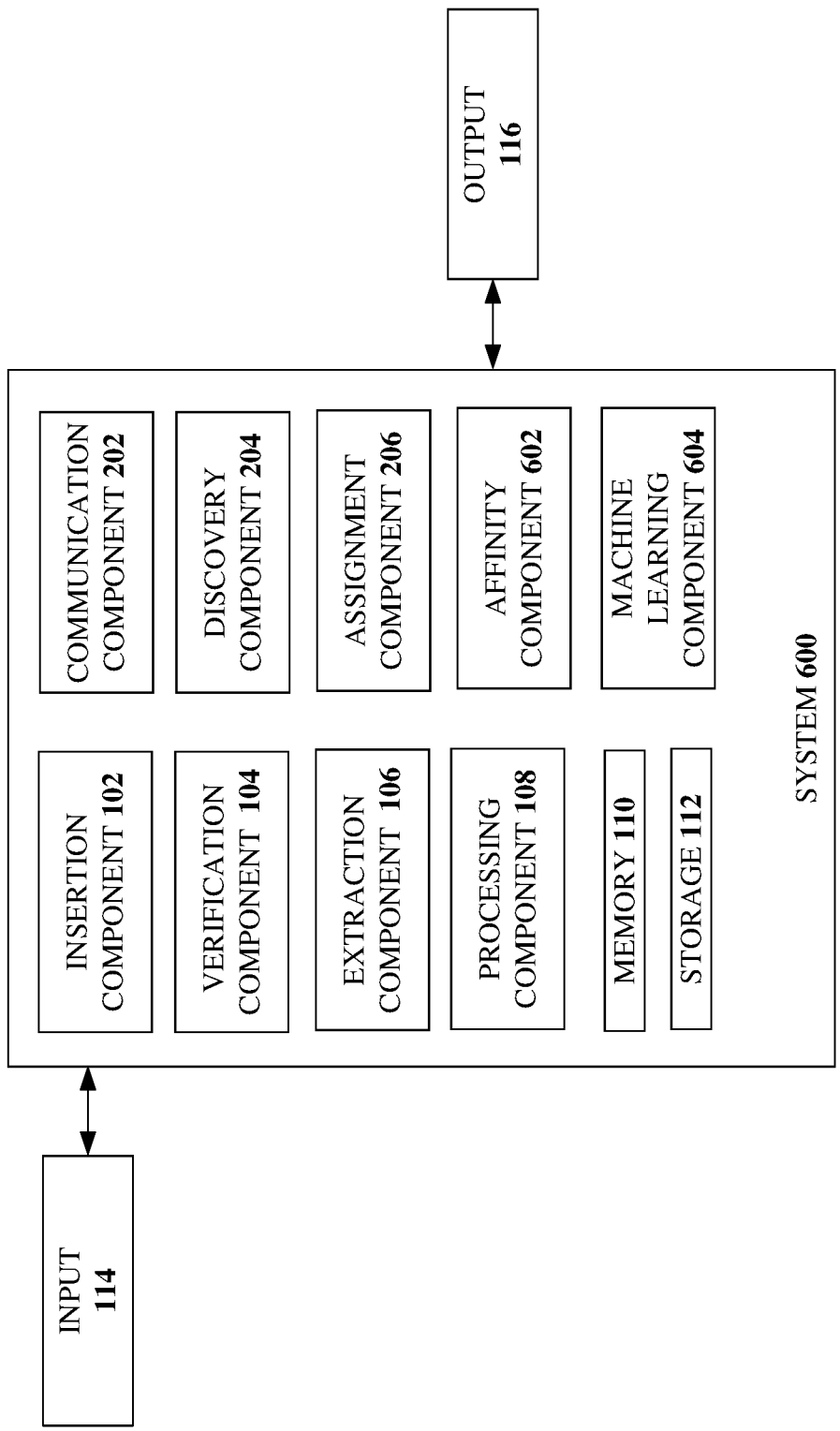
FIG. 6 illustrates a block diagram of an example, non-limiting, system that facilitates automatically inferring actions for a compliance aware service registry and load balancing in accordance with one or more embodiments described herein.

FIG. 6 illustrates a block diagram of an example, non-limiting, system 600 that facilitates automatically inferring actions for a compliance aware service registry and load balancing in accordance with one or more embodiments described herein. Repetitive description of like elements employed in other embodiments described herein is omitted for sake of brevity.

The system 600 can comprise one or more of the components and/or functionality of the system 100, the system 200, the system 300, the system 400, and the system 500, and vice versa. The system 600 can facilitate compliance of applications hosted on public clouds (e.g., PaaS, IaaS). Compliance as discussed herein can assist cloud providers with securing their platform from malicious users. Further, the disclosed aspects can assist users running on the cloud to meet their compliance goals while sharing the burden and/or responsibility with the provider. Users can validate compliance in different ways. For example, users can specify the compliance rules that apply to their goals (e.g., policies). Compliance rules can be checked and enforced at various states in the lifecycle of an application. For example, vulnerabilities can be detected and compliance rules can be enforced during multiple states of the development and operation cycles.

As an example, the system 600 can include the capability to scan containers and images to determine if the container and/or images are compliant or are non-compliant. In the contexts discussed herein, a service can be one instance of a container. The compliance determination can be performed at runtime and can be based on a defined policy. Thus, a service can be compliant for a first policy associated with a first entity, but non-compliant for a second policy associated with a second entity. In addition to the compliance determination, as the services and containers are made available for abstraction use, a load balancer (e.g., the assignment component 206) can add the services to one of the endpoints, which can be a container or service that is running. For example, there can be ten containers running and containers of the ten containers can comprise respective services, which can be different from one another. For example, a first container can run a first service, a second container can run a second service, a third container can run a third service, and so on, where the first service, the second service, and the third service can be different services.

The system 600 can include an affinity component 602 that can operate in conjunction with the assignment component 206 (e.g., the load balancer) to perform the routing based on what would be the best policy to select for a particular entity. For example, the affinity component 602 can utilize an affinity table that can associate one or more entities with respective policies, wherein policies were not previously associated with the one or more entities. For example, if a retail website provides products and/or services globally, the affinity component 602 can determine a first policy should be applied for users in Europe, a second policy should be applied for users in Asia, and a third policy should be applied for uses in the United States of America. The different policies can relate to general preferences of the users and the protections that should be enabled for the different groups of users. Accordingly, the affinity component 602 can utilize demographics in connection with provisioning services and/or policies and the assignment component 206 can optimize its load balancing based on the preferences of the users and the associated protections that should be applied.

For example, there can be multiple types of services with different policies from an efficiency standpoint. Therefore, the load balancer (e.g., the assignment component 206 and the affinity component 602) can allocate the services based on an affinity table with what is inferred to be the correct level of policy protection for a particular customer. For example, a service with a less rigid policy can be less expensive to run and faster to operate than another service with a more rigid policy. Thus, provisioning of the two services can be performed while attempting to achieve maximum throughput while keeping the customers happy. Accordingly, in this alternative implementation, the load balancing can be performed based on Internet Protocol (IP) address, location, or other demographics of the users. Thus, in some implementations, Quality of Service (QOS) can be a parameter of a policy.

Further, the system 600 can comprise a machine learning component 604 that can facilitate inferring, determining, or predicting a compliance state of a service and/or a load balancing of request traffic across the compliant services. In order to provide for or aid in the numerous inferences described herein (e.g., inferring, determining, or predicting compliance or non-compliance of a service at runtime and balancing of requests across the compliant services), components described herein can examine the services as compared to one or more policies at runtime and can provide for reasoning about or inferring states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events can be correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that can be near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also can be inclusive of statistical regression that can be utilized to develop models of priority.

Accordingly, based on respective policies and associated services, the system 600 can employ artificial intelligence in connection with a probabilistic-based analysis to infer, determine, or predict a compliance or non-compliance state of the service at runtime and automatically remove a non-compliant service from a load balancer ring. Moreover, a utility-based analysis can be employed where the cost of making an incorrect inference, determination, or prediction can be weighed against the benefit of making a correct inference, determination, or prediction.

Figure 7:
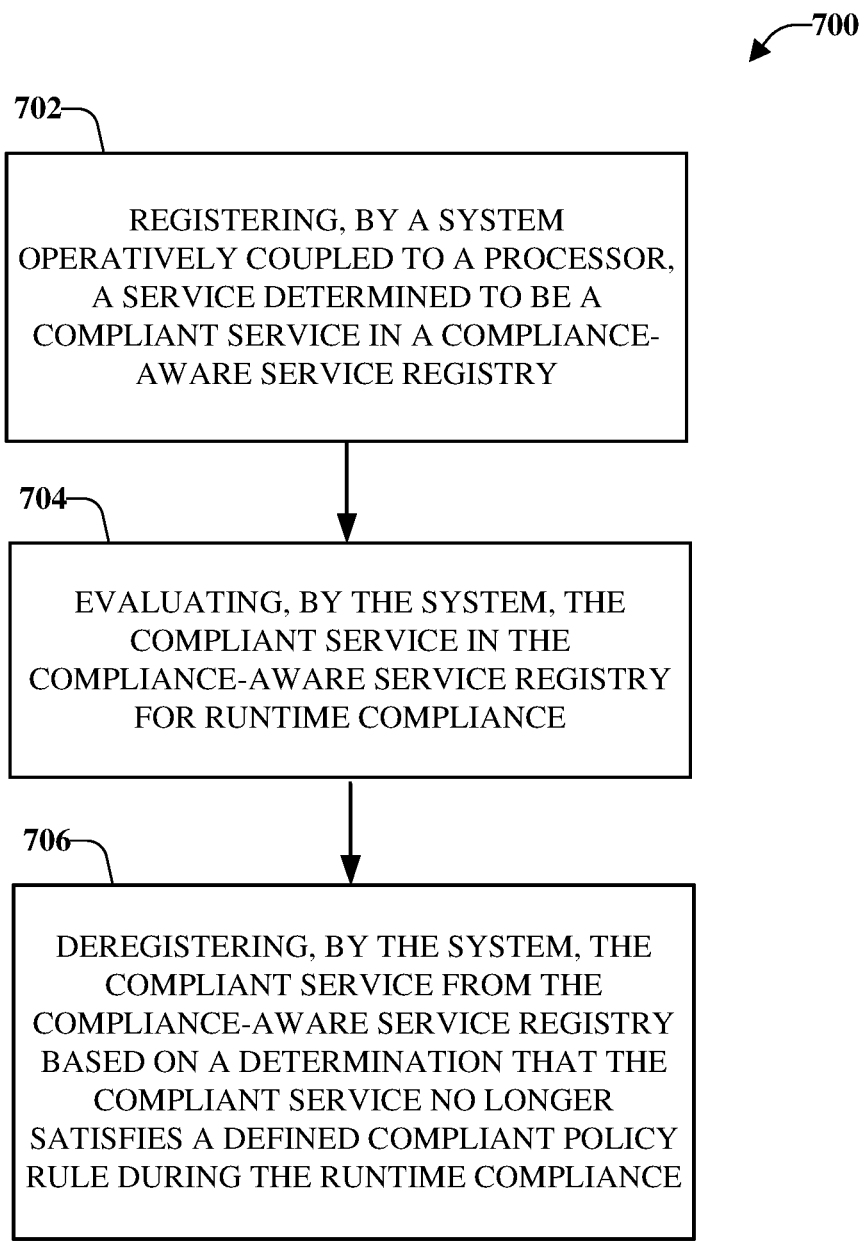
FIG. 7 illustrates a flow diagram of an example, non-limiting, computer-implemented method that facilitates compliance aware service registry and discovery in accordance with one or more embodiments described herein.

FIG. 7 illustrates a flow diagram of an example, non-limiting, computer-implemented method 700 that facilitates compliance aware service registry and discovery in accordance with one or more embodiments described herein. Repetitive description of like elements employed in other embodiments described herein is omitted for sake of brevity.

At 702 of computer-implemented method 700, a system operatively coupled to one or more processors, can register a service determined to be a compliant service in a compliance-aware service registry (e.g., via the insertion component 102). The service can be selected from a group consisting of a container, a virtual machine, and a physical host. According to an implementation, the registration of the service can include enabling the compliant service in the compliance-aware service registry to be discoverable by other services.

At 704 of computer-implemented method 700, the system can evaluate the compliant service in the compliance-aware service registry for runtime compliance (e.g., via the verification component 104). For example, although a service has been determined to be a compliant service during registration, based on a policy implemented at runtime, the service can be determined to not be compliant for the current application. Accordingly, in some implementations, evaluating the compliant service for runtime compliance can include evaluating the compliant service on a per policy basis. Evaluating the compliant service on a per policy basis can increase a compliance capability and routing efficiency of a load balancer ring.

According to some implementations, evaluating the compliant service in the compliance-aware service registry for the runtime compliance can comprise determining the service conforms to a policy. The policy can be selected from a group consisting of a security policy, a vulnerability policy, and a customized policy.

At 706 of computer-implemented method 700, the system can deregister the compliant service from the compliance-aware service registry based on a determination that the compliant service no longer satisfies a defined compliant policy rule during the runtime compliance (e.g., via the extraction component 106). In accordance with an implementation, deregistering the compliant service from the compliance-aware service registry can comprise removing the service from the compliance-aware service registry. In an additional or alterative implementation, deregistering the compliant service from the compliance-aware service registry can comprise rendering the service undiscoverable by other services.

Figure 8:
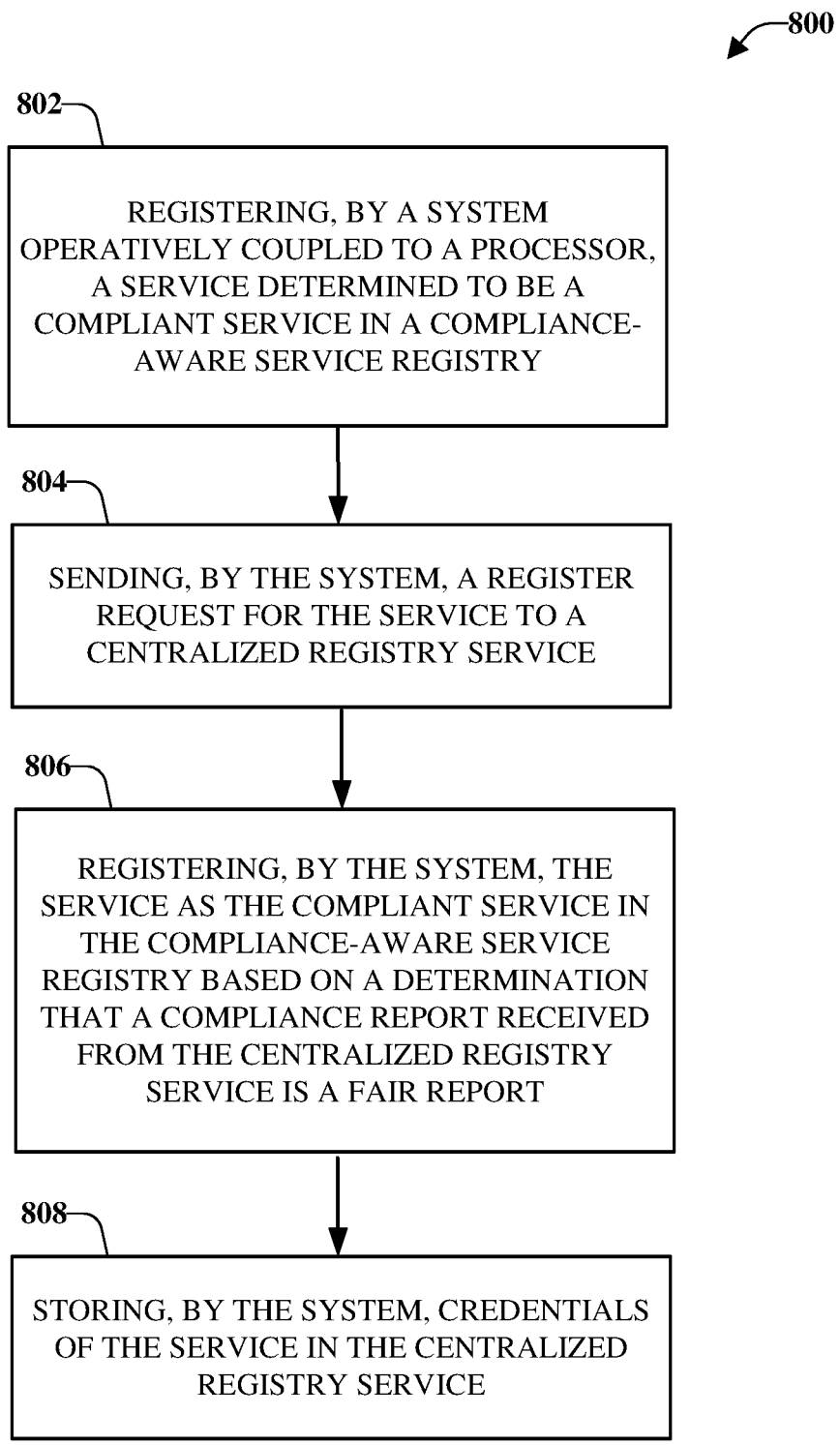
FIG. 8 illustrates a flow diagram of an example, non-limiting, computer-implemented method that facilitates compliance aware service registry and discovery based on a challenge-response model in accordance with one or more embodiments described herein.

FIG. 8 illustrates a flow diagram of an example, non-limiting, computer-implemented method 800 that facilitates compliance aware service registry and discovery based on a challenge-response model in accordance with one or more embodiments described herein. Repetitive description of like elements employed in other embodiments described herein is omitted for sake of brevity.

At 802 of the computer-implemented method 800, a system operatively coupled to one or more processors, can register in a compliance-aware service registry a service determined to be a compliant service (e.g., via the insertion component 102). Upon or after the compliant service is registered, the service can be discoverable by other services according to various aspects.

To register the service based on a challenge-response model, at 804 of computer-implemented method 800, the system can send a register request for the service to a centralized registry service (e.g., via the communication component 202). The centralized registry service can evaluate the service to determine a current compliance status of the service. Therefore, at 806 of computer-implemented method 800, the system can register the service as the compliant service in the compliance-aware service registry based on a determination that a compliance report received from the centralized registry service is a fair report (e.g., via the insertion component 102). The credentials of the service can be stored in the centralized registry service by the system, at 808 of computer-implemented method 800 (e.g., via the memory 110).

Figure 9:
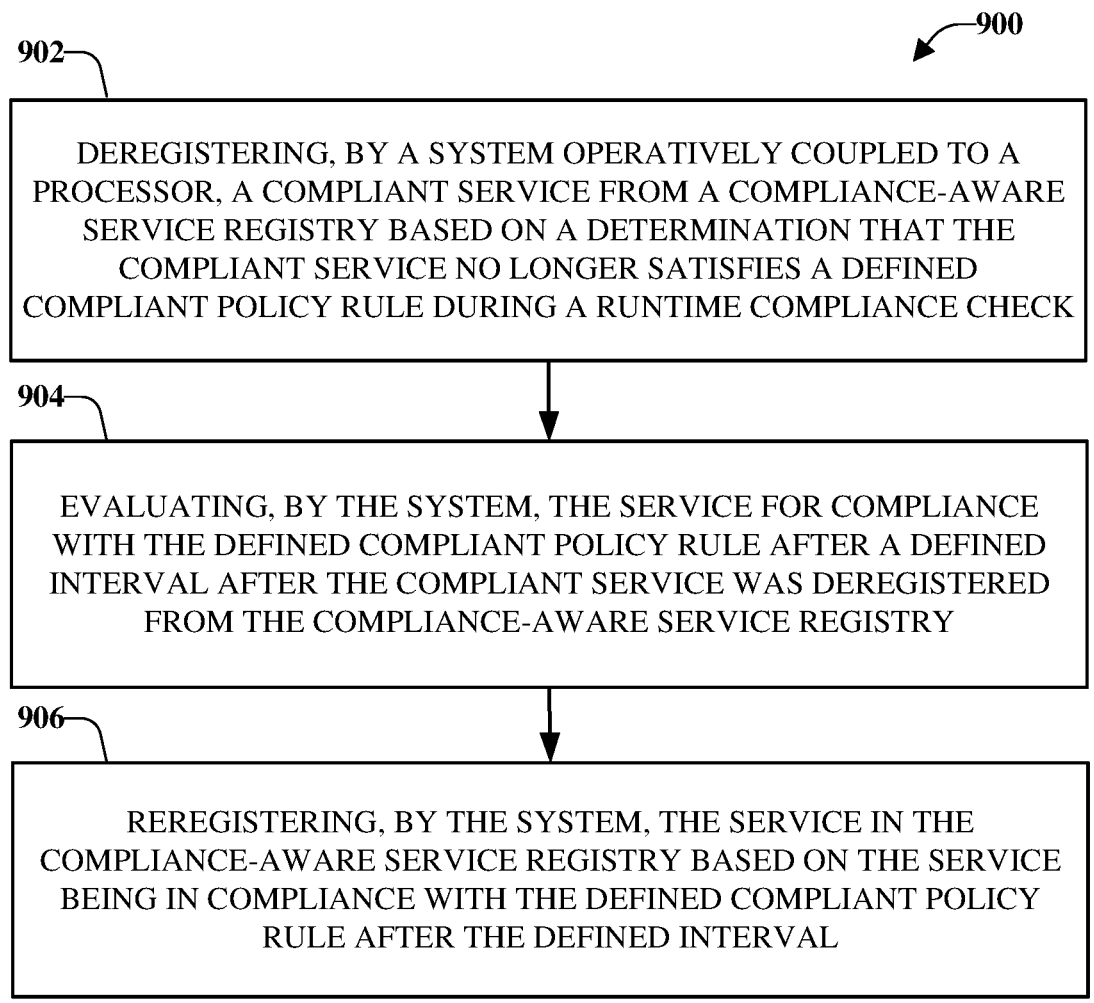
FIG. 9 illustrates a flow diagram of an example, non-limiting, computer-implemented method that facilitates registering a service previously determined to be noncompliant during runtime in accordance with one or more embodiments described herein.

FIG. 9 illustrates a flow diagram of an example, non-limiting, computer-implemented method 900 that facilitates registering a service previously determined to be noncompliant during runtime in accordance with one or more embodiments described herein. Repetitive description of like elements employed in other embodiments described herein is omitted for sake of brevity.

At 902 of the computer-implemented method 900, a system operatively coupled to one or more processors, can deregister a compliant service from a compliance-aware service registry based on a determination that the compliant service no longer satisfies a defined compliant policy rule during the runtime compliance (e.g., via the extraction component 106). For example, a service determined to be a compliant service can be registered in a compliance-aware service registry. During runtime, the compliant service can be evaluated for continuing compliance. Based on the runtime compliance determination, it can be determined that the service is not compliant for a policy under consideration during runtime.

After a defined interval after the compliant service was deregistered from the compliance-aware service registry, the system, at 904 of the computer-implemented method 900, can evaluate the service for compliance with a defined compliant policy rule, (e.g., via the verification component 104). For example, the defined compliant policy rule can be based on information contained in a request for the service (e.g., information related to an entity associated with a request, information related to a host through which the request is processed).

Further, at 906 of the computer-implemented method 900, the system can reregister the service in the compliance-aware service registry based on the service being in compliance with the defined compliant policy rule after the defined interval (e.g., via the insertion component 102). Accordingly, the various aspects can continually monitor the compliance status of the services as discussed herein.

Figure 10:
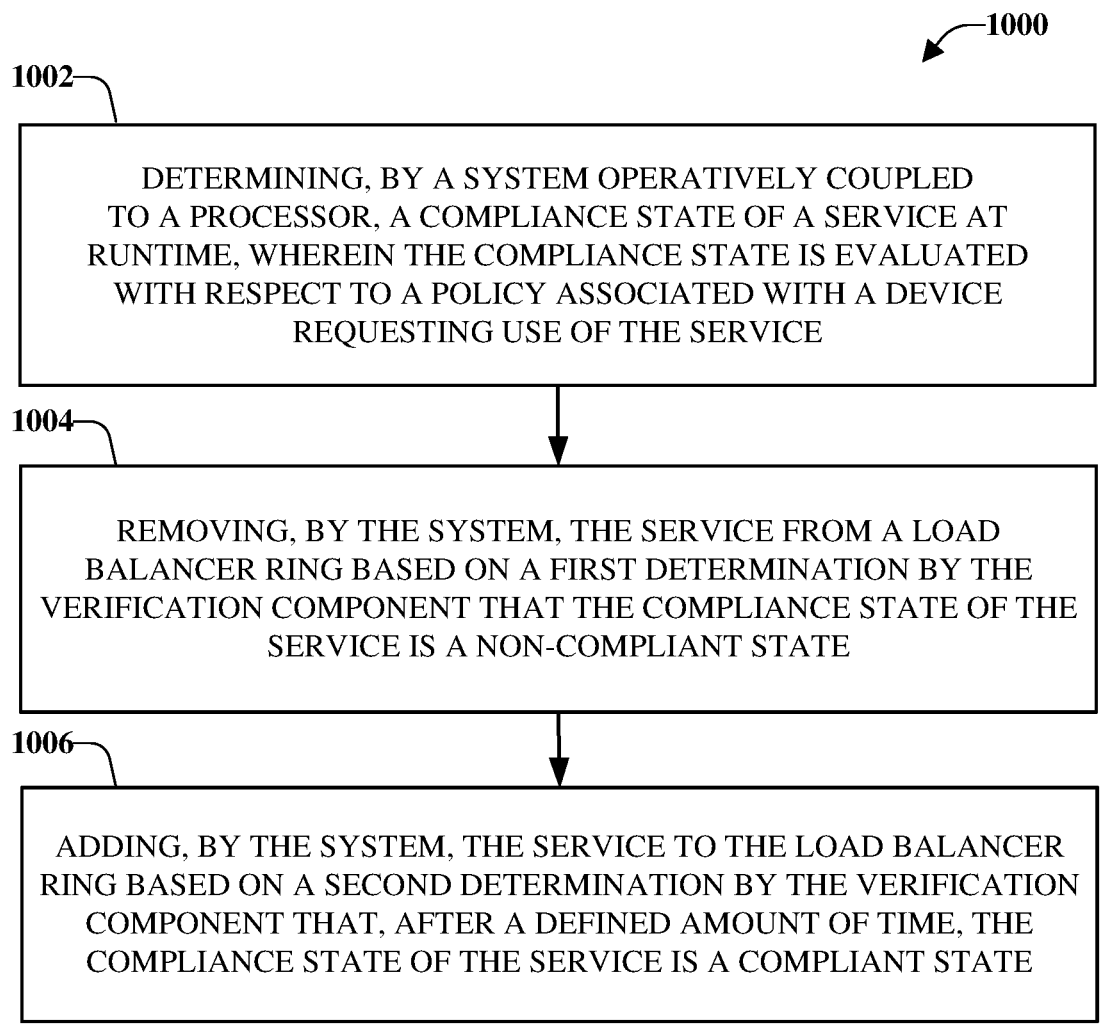
FIG. 10 illustrates a flow diagram of an example, non-limiting, computer-implemented method that facilitates load balancing associated with a compliance aware service registry in accordance with one or more embodiments described herein.

FIG. 10 illustrates a flow diagram of an example, non-limiting, computer-implemented method 1000 that facilitates load balancing associated with a compliance aware service registry in accordance with one or more embodiments described herein. Repetitive description of like elements employed in other embodiments described herein is omitted for sake of brevity.

The computer-implemented method 1000 can start, at 1002, when a system operatively coupled to a processor can determine a compliance state of a service (e.g., via the verification component 104). For example, the compliance state of the service can be determined at runtime. The compliance state can be evaluated with respect to a policy associated with a device requesting use of the service. In an example, the compliance state of the service can be determined using a balancing algorithm. According to an implementation, the balancing algorithm can be classified as a round-robin balancing algorithm. However, the disclosed aspects are not limited to a round-robin balancing algorithm and other balancing algorithms can be utilized to determine the compliance state of the service.

At 1004 of computer-implemented method 1000, the system can remove the service from a load balancer ring based on a first determination (e.g., via the verification component 104) that the compliance state of the service is a non-compliant state (e.g., via the extraction component 106). The first determination can be made based on a first policy defined for a first device that requests use of the service.

Further, at 1006 of computer-implemented method 1000, the system can add the service to the load balancer ring based on a second determination (e.g., by the verification component 104). For example, after a defined amount of time, the compliance state of the service can be determined to be a compliant state (e.g., via the assignment component 206). The second determination can be made based on the first policy defined for the first device that requests use of the service.

According to some implementations, the computer-implemented method 1000 can include performing a third determination and a forth determination based on a second policy defined for a second device that requests use of the service (e.g., via the verification component 104). The first determination and the second determination can be independent of the third determination and the fourth determination.

In accordance with an implementation, the computer-implemented method 1000 can include forwarding request traffic for the service to a compliant service. Further, the request traffic bypasses a non-compliant service.

As discussed herein, the various aspects can help ensure service level compliance at runtime that comprises the combination of a compliance check with microservice discovery and a compliance-aware load balancing. For example, after a certain time interval, a determination can be made whether a service removed from the load balancer ring is compliant. If the service previously removed is determined to be compliant, the service can be added into the load balancer ring.

For example, discussed herein is a method for ensuring service level compliance at runtime. The method can comprise determining whether a service is a compliant service, the compliant service can be characterized by having satisfied at least one user compliant policy rule. The method can also include registering the compliant service in a compliance-aware service registry, the registration can be implemented through a challenge-response model. The challenge response model can comprise sending, by the service, a register request to a centralized registry service and requesting, by the centralized registry service, a compliance report from a trusted entity. The challenge response model can also comprise determining, by the centralized registry service, whether the compliance report is a fair report and, upon or after determining that the compliance report is fair, registering the compliant service in the compliance-aware service registry and storing the credentials of the service. Further, the method can include enabling the compliant services in the compliance-aware service registry to be discovered by other services. In addition, the method can comprise evaluating the registered compliant service in the compliance-aware service registry for runtime compliance and deregistering the registered compliant service in the compliance-aware service registry if it no longer satisfies the at least one user compliant policy rule.

In another example, provided herein is a compliance aware load balancer configured to determine a compliance state of services in conjunction with traditional balancing algorithms, such as round-robin for example. If the state of the service is determined to no longer be compliant, the compliance aware load balancer can remove the service from the load balancer ring. Then, after a certain time interval, the system can determine whether a service removed from the load balancer ring is compliant. If the service removed from the load balancer ring is determined to be compliant, the compliance aware load balancer can re-add the service (previously removed from the load balancer ring) into the load balancer ring.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 11:
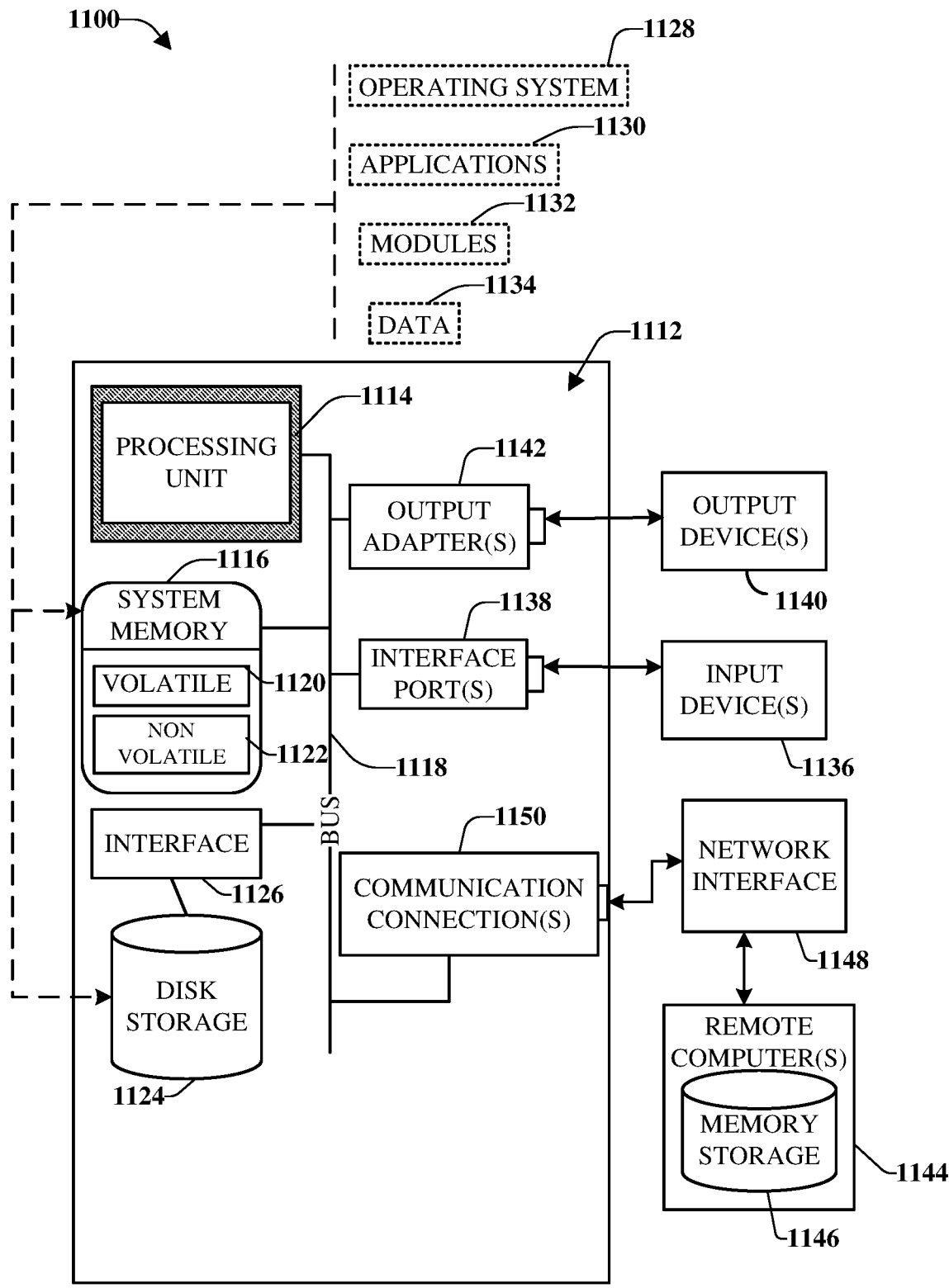
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity. With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a method of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
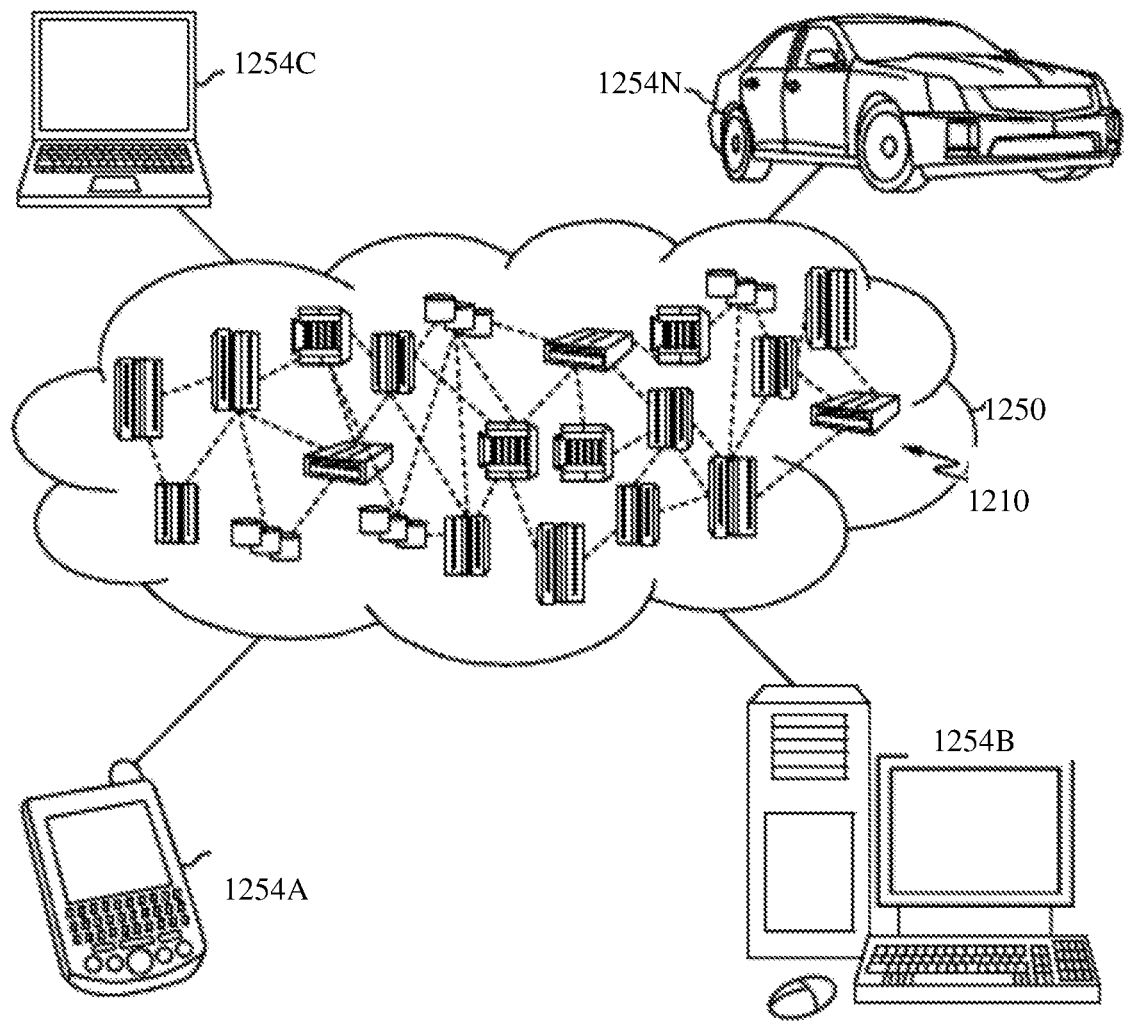
FIG. 12 depicts a cloud computing environment in accordance with one or more embodiments described herein.

Referring now to FIG. 12, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
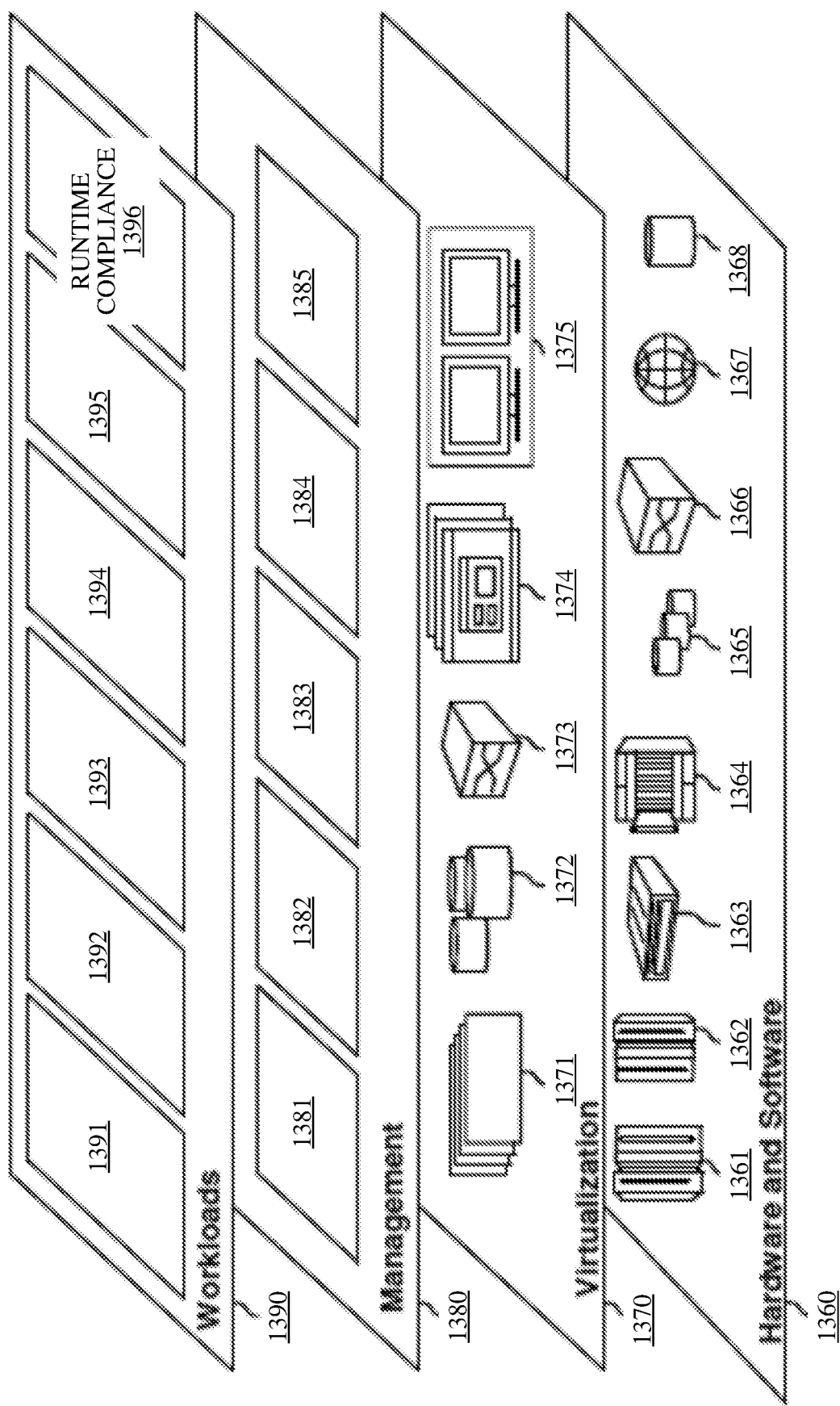
FIG. 13 depicts abstraction model layers in accordance with one or more embodiments described herein.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided: Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, the procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and runtime compliance 1396.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
registering, by a system operatively coupled to a processor, a service determined to be a compliant service in a compliance-aware service registry;
evaluating, by the system, the compliant service in the compliance-aware service registry for runtime compliance; and
deregistering, by the system, the compliant service from the compliance-aware service registry based on a determination that the compliant service no longer satisfies a defined compliant policy rule during the runtime compliance, wherein the evaluating the compliant service comprises evaluating the compliant service on a per policy basis, and wherein the evaluating the compliant service on the per policy basis increases a compliance capability and routing efficiency of a load balancer ring.

2. The computer-implemented method of claim 1, wherein the registering the service is based on a challenge-response model comprising:
   sending, by the system, a register request for the service to a centralized registry service;
   registering, by the system, the service as the compliant service in the compliance-aware service registry based on a determination that a compliance report received from the centralized registry service is an objective report; and
   storing, by the system, credentials of the service in the centralized registry service.

3. The computer-implemented method of claim 1, further comprising:
   enabling, by the system, the compliant service in the compliance-aware service registry to be discoverable by other services.

4. The computer-implemented method of claim 1, further comprising:
   evaluating, by the system, the service for compliance with the defined compliant policy rule after a defined interval after the compliant service is deregistered from the compliance-aware service registry; and
   reregistering, by the system, the service in the compliance-aware service registry based on the service being in compliance with the defined compliant policy rule after the defined interval.

5. The computer-implemented method of claim 1, wherein the deregistering the compliant service from the compliance-aware service registry comprises removing the service from the compliance-aware service registry.

6. The computer-implemented method of claim 1, wherein the deregistering the compliant service from the compliance-aware service registry comprises rendering the service undiscoverable by other services.

7. The computer-implemented method of claim 1, wherein the service is selected from a group consisting of a container, a virtual machine, and a physical host.

8. The computer-implemented method of claim 1, wherein the evaluating the compliant service in the compliance-aware service registry for the runtime compliance comprises determining the service conforms to a policy, wherein the policy is selected from a group consisting of a security policy, a vulnerability policy, and a customized policy.

9. A system, comprising:
   a memory that stores computer executable components; and
   a processor that executes the computer executable components stored in the memory, wherein the computer executable components comprise:
      an insertion component that registers a service determined to be a compliant service in a compliance-aware service registry;
      a verification component that evaluates compliant service in the compliance-aware service registry for runtime compliance; and
      an extraction component that deregisters the compliant service from the compliance-aware service registry based on a determination that the compliant service no longer satisfies a defined compliant policy rule during the runtime compliance, wherein the verification component determines a compliance state of the service using a balancing algorithm.

10. The system of claim 9, wherein the verification component determines a compliance state of the service at runtime, and wherein a determination of the compliance state of the service at runtime increases a routing efficiency of a load balancer ring.

11. The system of claim 9, wherein the verification component performs a first determination and a second determination based on a first policy defined for a first device that requests use of the service.

12. The system of claim 11, wherein the first policy comprises a quality of service parameter defined for the first device.

13. The system of claim 11, wherein the verification component performs a third determination and a fourth determination based on a second policy defined for a second device that requests use of the service.

14. The system of claim 13, wherein the first determination and the second determination are independent of the third determination and the fourth determination.

* * * * *